Dec. 11, 1928.
C. I. HALL
1,694,977
CIRCUIT CONTROLLING DEVICE AND SYSTEM EMPLOYING THE SAME
Filed June 5, 1925
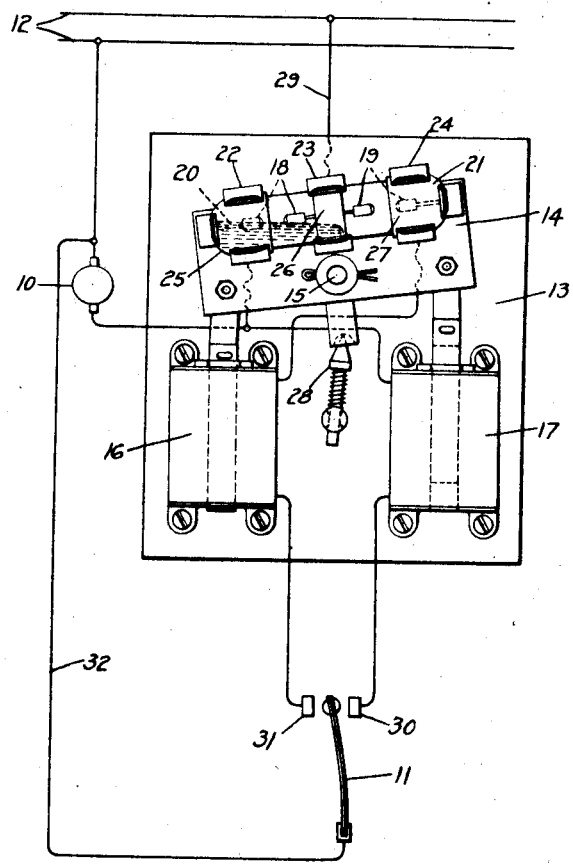
Inventor:
Chester I. Hall,
by
His Attorney.

Patented Dec. 11, 1928.

1,694,977

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

CIRCUIT-CONTROLLING DEVICE AND SYSTEM EMPLOYING THE SAME.

Application filed June 5, 1925. Serial No. 35,265.

This invention relates to electrically operated circuit controlling devices, and it has particular reference to automatic control systems in which a switch is electrically operated between two positions under the control of an automatic device such as a thermostatic master switch or the like.

The invention provides an improved arrangement whereby the electrically operated switch interrupts its own energizing circuit after the completion of the operation thereof to each position.

Briefly, this is accomplished in accordance with my invention by providing the switch with relatively movable contacts which are connected to control the energizing circuit of the electric operating means for the switch jointly with the master switch and are arranged to remain in circuit-closing relation until after operation of the switch to each position.

The invention may be employed advantageously in sign flashing systems, heat regulating systems, motor control systems, and in other similar service to relieve a relatively feeble and slow moving automatic master switch, such as a thermal-responsive switch, a pressure-responsive switch, or the like, of the duty of interrupting the energizing circuit of the electrically operated circuit controlling device and, at the same time, to insure continued energization of the electrically operated circuit controlling device during the entire movement thereof from each position to the other. Thus arcing and pitting of the master switch contacts is effectively eliminated even though the energizing circuit of the electrically operated circuit controlling device is of relatively high inductance, as is ordinarily the case when the device is operated by means of electromagnets. Likewise, the continued energization of the electro-responsive operating means during the operation of the circuit controlling device prevents faulty or incomplete movement thereof between different operating positions, although the electro-responsive operating means is deenergized immediately after the completion of the operation of the circuit controlling device to each position.

The invention will be better understood from a consideration of the accompanying drawing in which the single figure diagrammatically illustrates a thermostatic control system for an electric motor employing an electrically operated circuit controlling device arranged in accordance with my invention.

Referring to the drawing, the motor control system illustrated is particularly adapted for control of a motor employed in a refrigerating system. Thus it may be assumed that the motor 10 is operatively connected to a suitable compressor and the thermostatic master switch 11 is suitably located in a refrigerating chamber to control the operation of the motor 10. The connection of the motor 10 to suitable supply lines 12 is under the control of an electrically operated circuit controlling device 13 which in turn is controlled by the thermostatic master switch 11.

In the preferred form illustrated, the electrically operated circuit controlling device comprises a tilting mercury switch 14 which is pivotally mounted upon the rod 15, and is arranged to be tilted into the inclined position in which it is shown by the operating electromagnet 16 and into the oppositely inclined position by the operating electromagnet 17. The contacts 18 and 19 and the globule of mercury 20 of the mercury switch are enclosed within a container 21, preferably of glass, which may be exhausted or filled with non-oxidizing gas if desired. The mercury 20 is biased by gravity to flow into circuit closing relation with the contacts 18 when the mercury switch is inclined to the position shown and into circuit closing relation with the contacts 19 when the switch is oppositely inclined. Preferably the container 21 is removably mounted in spring contact clips 22, 23, 24, and the spaced pairs of contacts 18, 19, are mounted in alignment along the axis of the cylindrically shaped container 21 and electrically connected to the contact clips by means of suitable bands 25, 26, 27, secured to the exterior of the casing 21 as shown.

In order to prevent accidental movement of the mercury switch by extraneous jars or vibrations, or the like, suitable means, such as the spring pressed toggle mchanism 28, may be provided for maintaining the mercury switch 14 in each of its oppositely inclined positions.

In accordance with my invention the arrangement of the contacts 18 and 19 and the globule of mercury 20 is such that the mercury is maintained in engagement with the corresponding pair of contacts during a quick operation of the mercury switch from each inclined position to the other. By properly proportioning the size of the container 21 and the volume of the mercury 20, the inertia of the mercury will serve to maintain the same in circuit closing relation with each pair of contacts until after operation of the mercury switch to the oppositely inclined position in which the mercury is biased by gravity to flow into circuit closing relation with the other pair of contacts.

It will be observed that the mercury switch 14 is connected to control the energizing circuit of each of the operating electromagnets 16 and 17 jointly with the two-position thermal-responsive master switch 11. The manner in which this is accomplished will be better understood from a description of the operation of the control system illustrated, which is as follows:

With the supply lines 12 energized and the mercury switch 14 in the position shown, the energizing circuit of the motor 10 is completed from the lower supply line through the motor and thence through the spring clip 22, which is electrically connected to the left hand contact 18 through the band 25, the mercury 20 and the right hand contact 18, which is electrically connected to the spring clip 23 through the band 26, and thence through the conductor 29 to the upper supply line. Under these conditions operation of the thermostatic master switch 11 to the right into engagement with the stationary contact 30 connects the operating electromagnet 17 to the supply lines 12 in parallel circuit with the motor 10. The resulting energization of electromagnet 17 serves to quickly tilt the mercury switch 14 from the position in which it is shown to the oppositely inclined position. During this operation the mercury 20 remains in circuit closing engagement with the contacts 18 and hence maintains both the motor 10 and electromagnet 17 energized. After the completion of the operation of the mercury switch 14 to the oppositely inclined position the mercury 20 then moves out of circuit closing relation with the contacts 18 and flows into engagement with the contacts 19, thereby interrupting the energizing circuits of both motor 10 and operating electromagnet 17.

The motor and the electrically operated switch mechanism remain in the unenergized condition until the thermostatic master switch 11 moves to the left into engagement with the stationary contact 31. This establishes an energizing circuit for operating electromagnet 16 extending from the lower supply line 12 through the conductor 32, the master switch 11, contact 31, the operating winding of electromagnet 16, spring clip 24, which is electrically connected to the right hand contact 19 through the band 27, the mercury 20, the left hand contact 19 which is electrically connected to the spring clip 23 through the band 26 and conductor 29, to the upper supply line 12. During the resulting quick operation of the mercury switch 14 to the inclined position in which it is shown, the mercury 20 remains in circuit closing relation with the contacts 19, and thus insures that the operating electromagnet 16 is maintained energized until after the completion of the movement of the mercury switch.

Upon re-engagement of the mercury with the contacts 18, motor 10 is again energized from the supply lines 12, while the operating electromagnet 17 is deenergized as soon as the mercury flows out of engagement with the contacts 19. Thus it will be seen that the mercury switch 14 is operated between its oppositely inclined positions in accordance with the movement of the two-position thermostatic master switch 11 without requiring the latter at any time to interrupt the energizing circuits of the operating electromagnets 16 and 17. As previously pointed out, the continued energization of the operating electromagnet during the operation of the mercury switch insures against faulty or incomplete operation thereof to either of its operative positions, while the toggle mechanism 28 prevents accidental jar or creeping of the mercury switch from each position.

While I have described my invention in connection with a tilting mercury switch, it will be understood that the invention is not necessarily limited thereto but may be carried out by other means.

What I claim as new and desire to secure by Letters Patent of the United States, is:

1. An electrically operated circuit controlling device comprising a movable switch member, electro-responsive operating means for quickly operating the movable switch member between two positions, contact mechanism operated by the switch member for controlling the said operating means, and inertia means for delaying operation of the said contact mechanism to control the said operating means upon a quick movement of the switch member from each of said positions to the other.

2. An electrically operated circuit controlling device comprising a movable switch member, an electro-responsive operating means for quickly operating the movable switch member between two positions, and fluid contact means operated by the switch member for controlling the said operating means and having such inertia as to operate a time interval after the quick operation of said switch member from each of said positions to the other.

3. An electrically operated circuit controlling device comprising a movable switch member, electro-magnetic means for operating the movable switch member with a snap action between two positions, fluid circuit controlling means operated by the switch member and having such inertia as to operate with a time delay, and connections whereby the said contact means varies the energization of said operating means a time interval after operation of said switch member from each of said positions to the other.

4. An electrically operated circuit controlling device comprising a circuit controlling element movable in the arc of a circle from one position to another position, a relatively movable circuit controlling element operable into circuit closing engagement with said first element in said one position and having such inertia as to be moved integrally therewith by centrifugal force upon a quick movement of said first element from said one position to the other position and thereby being biased to move out of circuit closing engagement with said first element, and electro-responsive means for quickly operating said first element from said one position to the other position connected to be energized through said circuit controlling elements whereby the said means is maintained energized until after the completion of the operation of said first element to said other position.

5. An electrically operated circuit controlling device comprising a movable container operable to a plurality of positions and having a plurality of contacts disposed in spaced relation, a conducting fluid in said container the said fluid being biased into circuit closing engagement with a corresponding one of the said contacts in each position of the container and having such inertia as to temporarily remain in circuit closing engagement with the corresponding contact upon the operation of said container from each of said positions to another of said positions, and electro-responsive means for operating the said container from each of said positions to the other, the said means being connected to be energized through said conducting fluid and the corresponding contact whereby the said means is maintained energized during and until after completion of the operation of said container from each of said positions to another of said positions.

6. An electrically operated tilting switch mechanism comprising a pivotally mounted circuit controlling member operable between oppositely inclined positions and having contacts disposed in spaced relation, a relatively movable circuit controlling element biased into circuit closing engagement with a corresponding one of said contacts in each position of said member and arranged to remain in engagement with the corresponding contact upon a quick operation of the pivoted member from each position to the other, a separate electromagnet for quickly operating the pivoted member to each position, and connections controlled by said element in each position of said member whereby upon energization of the electromagnet for operating the member to the other position said electromagnet is maintained energized until after completion of the operation of the pivoted member to the other position.

7. The combination of a fluid switch operable between oppositely inclined positions and having a plurality of contacts disposed in spaced relation and a globule of conducting fluid arranged to remain in engagement with a corresponding one of said contacts for an interval of time upon a quick operation of the switch from each inclined position to the other and then move into circuit closing engagement with another of said contacts, a separate electro-magnet for quickly tilting the said switch to each inclined position, and connections controlled by the conducting fluid in each inclined position of said switch whereby upon energization of the electro-magnet for operating the switch to the other position the said electro-magnet is maintained energized during the movement of the switch and until after operation of the switch to the other position.

8. A time element electric circuit controlling device comprising a pivotally mounted member operable between oppositely inclined positions, a fluid switch including a closed container removably mounted on said member and having a plurality of pairs of contacts mounted in spaced alignment within said container, and a globule of conducting fluid biased into circuit-closing engagement with a corresponding pair of said contacts when the said member with the fluid switch mounted thereon is tilted into each of said oppositely inclined positions, the inertia of said conducting fluid being such as to maintain the fluid in engagement with each pair of said contacts for an interval of time upon a quick operation of the switch from the corresponding inclined position to the other against the resulting bias of the fluid into circuit-closing engagement with the other pair of said contacts.

9. A time element electric circuit controlling device comprising a pivotally mounted member operable between oppositely inclined positions and having a plurality of spring clip terminals mounted thereon, a substantially cylindrical closed container having a plurality of pairs of contacts mounted in spaced alignment along the axis thereof and electrically connected with corresponding contact bands on the exterior of the casing for mounting in said spring clip terminals to establish electrical connection therebetween, and a globule of conducting fluid in said container arranged to be biased into circuit-closing engagement with a corresponding pair of said contacts upon operation of said member to each of said oppositely inclined positions, said globule of fluid having such inertia as to remain temporarily in circuit-closing engagement with the corresponding pair of contacts upon a quick operation of said member from each of said oppositely inclined positions to the other position.

In witness whereof I have hereunto set my hand this first day of June 1925.

CHESTER I. HALL.